July 21, 1959     F. W. KRAUSS     2,895,254
COMBINED FISH LURE AND BAIT HOLDER
Filed Dec. 2, 1957
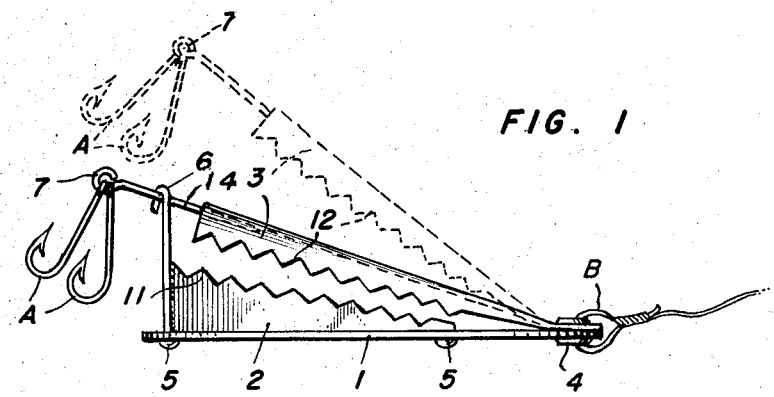
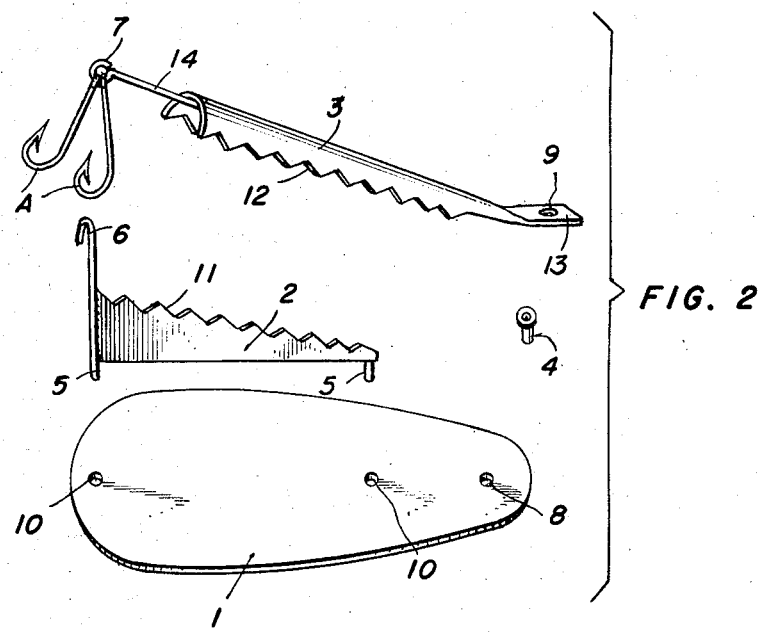
INVENTOR
FRED W. KRAUSS
BY *James M. Drysdale*
ATTORNEY

United States Patent Office 2,895,254
Patented July 21, 1959

2,895,254
COMBINED FISH LURE AND BAIT HOLDER

Fred W. Krauss, Pittsburgh, Pa.

Application December 2, 1957, Serial No. 700,135

5 Claims. (Cl. 43—44.6)

This invention relates to a combined fish lure and bait holder adapted for use by trolling or casting in substantially the same manner as are devices commonly known as spoons, plugs, lures, etc.

A principal object of the invention is to provide a device combining features of a lure and of a bait holder.

A further object is to provide simplified but efficient bait holding means in which bait may be easily secured and from which the bait or parts thereof may be easily removed.

In the drawing, which shows a preferred form of the invention, Fig. 1 shows the parts as they are assembled for use but without bait that may be held thereby; and Fig. 2 is an exploded view showing the parts separated but ready for assembly as in Fig. 1.

Referring to the drawing for details, the device includes three main parts, a base plate 1, preferably of metal or an alloy which may have its surface plated, polished, painted or enameled as in fishing lures known in this art; an upright member 2 for attachment to the base plate; and a pivoted member 3 mounted on the base plate and swingable over the base and the upright member for holding bait between said pivoted and upright members.

Base plate 1, as shown, is provided with three openings, 8, 10, 10, and is of generally oval or ovate form.

Upright member 2 is of metal or alloy, has a generally triangular form, is provided along one side with teeth or serrations, 11, on another side with pins or lugs, 5, spaced to fit in holes 10 in the base plate, and at the top end of its third side with hook 6 under which one end of the pivoted member is placed when bait is held by the device.

The pivoted member 3 is preferably of metal as spring steel, brass or bronze, shaped in a rounded or concave form in cross-section except at one end, 13, where it is flat and provided with opening 9 for receiving the hollow rivet 4, to loosely hold the member on the base plate. End 13 is bent so that a spring action is provided for holding the pivoted member in place over the upright member when a rod or wire, 14, soldered or welded to the pivoted member, is engaged under hook 6. Pivoted member 3 has teeth or serrations 12 on the edges of its concave part to coact with teeth 11 on the upright member to firmly hold bait in place.

The upright member 2 is mounted on the base by placing pins or lugs 5 in holes 10 and then securing the lugs in place by rivetting or spot welding.

The pivoted member is loosely attached to the base by placing hollow rivet 4 through opening 9 in the member and opening 8 in the base and then peening or spot welding the rivet to the base but in a manner to allow free swinging movement of member 3.

The opening through the hollow rivet allows a fishing line, B, or wire leader, or the like, to be passed therethrough to secure the lure to a line.

Rod or wire, 14, at one end of member 3, is provided with a loop or eye, 7, for attaching fishing hooks, A. Hooks used may be double, as shown by the drawing, or of other numbers or forms, if desired.

Bait is secured on the device by placing it on teeth 11 then swinging member 3 over the bait, pressing teeth 12 downward and engaging rod or wire 14 under hook 6. To remove bait or part thereof, wire 14 is disengaged and member 3 swung to one side allowing easy removal of the bait or any part thereof without cutting.

While a specific and preferred form of the device has been shown and described, it is obvious that changes or modifications may be made in materials used or form of parts without departing from the spirit of the invention.

I claim:

1. A fish lure and bait holder comprising a substantially flat metallic base plate, a generally triangular metallic member rigidly mounted at one edge on the base plate, and a pivoted metallic member mounted at one end on said base plate and swingable to a position over a second edge of said triangular member for holding bait between said members, hook means at the third edge of the triangular member, and latch means on the pivoted member for engaging said hook means to hold the said members in bait holding relation.

2. A fish lure and bait holder comprising a substantially flat metallic base plate ovate in outline; a generally triangular metallic plate-like member rigidly mounted at one edge on the base plate; and an elongate pivoted member loosely mounted at one end near one end of the base plate and swingable over a second edge of said triangular member for holding bait between said members; hook means projecting from the third edge of the triangular member, and a latch wire on the pivoted member for engaging said hook means for holding bait between the members.

3. A device as in claim 2 in which the latch wire is provided at its free end with a lop or eye for attaching fishing hooks to the device.

4. A device as in claim 3 in which the pivoted member is mounted on the base plate by a hollow rivet through which a fishing line or the like may be passed.

5. A device as in claim 4 in which part of the pivoted member is concave to fit over the second edge of the triangular member and said concave part and said second edge are provided with bait holding teeth.

References Cited in the file of this patent
FOREIGN PATENTS

| 8,409 | Great Britain | 1908 |
| 23,457 | Great Britain | 1894 |
| 260,496 | Switzerland | 1949 |